US006782088B1

(12) United States Patent
Gabara

(10) Patent No.: US 6,782,088 B1
(45) Date of Patent: Aug. 24, 2004

(54) APPARATUS AND METHOD FOR DOWNLOADING A FORWARDING TELEPHONE NUMBER

(75) Inventor: Thaddeus John Gabara, Murray Hill, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/144,098

(22) Filed: Aug. 31, 1998

(51) Int. Cl.[7] .............................................. H04M 3/42
(52) U.S. Cl. .............................. 379/211.02; 379/201.05
(58) Field of Search ...................... 379/201.01–201.12, 379/207.01, 210.01–210.03, 211.01–211.05, 188, 199, 142.01–142.18

(56) References Cited

U.S. PATENT DOCUMENTS

| | | | | |
|---|---|---|---|---|
| 5,329,578 A | * | 7/1994 | Brennan et al. | 379/211.03 |
| 5,436,963 A | * | 7/1995 | Fitzpatrick et al. | 379/212 |
| 5,689,547 A | * | 11/1997 | Molne | 379/58 |
| 5,764,731 A | * | 6/1998 | Yablon | 379/213.01 |
| 5,799,066 A | * | 8/1998 | Joyce et al. | 379/88.04 |
| 6,094,477 A | * | 7/2000 | Nada et al. | 379/93.24 |
| 6,442,263 B1 | * | 8/2002 | Beaton et al. | 379/142.04 |

* cited by examiner

Primary Examiner—Benny Tieu

(57) ABSTRACT

Apparatus and processes for downloading data corresponding to forwarding information, e.g., a forwarding telephone number, from either a central office or from the telephone of a called party. In one embodiment, a central office downloads data corresponding to forwarding information to a calling party using, e.g., FSK signaling techniques. The calling party preferably receives the downloaded data corresponding to the forwarding information using a call information detector/receiver, e.g., a Caller ID receiver. In another embodiment, the telephone corresponding to a called party answers the incoming call and downloads data to the calling party relating to forwarding information, e.g., a forwarding telephone number. Preferably, the data is transmitted from the called party to the calling party after the called telephone answers the call using DTMF tone encoding techniques. The DTMF tones may correspond to digits of a forwarding telephone number and may be recorded as part of an audible outgoing greeting message. Alternatively, the DTMF tones may be regenerated for each telephone call using a DTMF generator. The forwarding telephone number is preferably stored in the calling telephone for use in a subsequent dialing of the forwarding telephone number, and also for future retrieval in the event that the user again calls the same original telephone number to avoid repeated listening to outgoing greeting messages the next time you call or repeated reception of downloaded data corresponding to a forwarding telephone number.

20 Claims, 5 Drawing Sheets

APPARATUS AND METHOD FOR DOWNLOADING A FORWARDING TELEPHONE NUMBER

BACKGROUND OF THE INVENTION

1. Field of the Invention

This invention relates generally to an apparatus and method for obtaining and/or calling a forwarding telephone number. More particularly, it relates to an apparatus and method which automatically downloads a forwarding telephone number from a central office or telephone during a first telephone call, allowing a second call to the forwarding telephone number.

2. Background of Related Art

The number of telephone numbers in the United States is proliferating at an increasing rate due among other things to an increased consumer demand for multiple telephone lines to accommodate such uses as facsimile machines, internet access, e-mail services, etc.

Occasionally a person's telephone number changes, either permanently or temporarily. If a person or business moves, the word may not reach all possible callers that their former telephone number is no longer the preferred number for reaching the person or business. Moreover, a person may be in transit or otherwise moving from telephone to telephone and may desire, at least at certain times, that they be called at a telephone number other than the one which was originally called.

In the case of a permanent move, most telephone companies provide a service for a limited time which provides a voice message to all callers indicating that the called telephone number is no longer in service, and that a new telephone number should be used. Then, the voice message played by the central office typically includes a verbal recitation of the new telephone number. Such conventional forwarding information is useful and allows a caller to get in touch with the intended called party, but requires the caller to write down the new telephone number, and then manually dial the new forwarding telephone number. This requires additional time and also requires that the caller have a pen and paper handy (which may not always be the case-particularly if the caller does not expect that the called party's telephone number has changed). Moreover, the forwarding information is given to all callers no matter who they are.

Conventional central office techniques either play a message to the caller indicating the new telephone number but don't automatically forward the call, or invisibly forward a telephone call without indicating to the caller the actual telephone number ultimately called. The former situation requires more time on the part of the caller as well as a pen and paper, while the latter situation does not provide the detailed forwarding information to the caller necessary to avoid a repeated call to the same original telephone number.

If the originally called telephone line remains active, a telephone answering device or other voice messaging system can answer the call and play an appropriate outgoing greeting message to all callers alerting them to a forwarding telephone number. However, if the user is only temporarily at a different telephone number, then they must frequently switch between an outgoing greeting message which includes verbal forwarding information when away and a normal outgoing greeting message which does not contain verbal forwarding information when the user is local to the telephone.

FIG. 5 illustrates a conventional telephone answering device 11 capable of answering an incoming call from a calling party's telephone 13 using telephone lines 15 and 16.

In particular, as shown in FIG. 5, a calling party's telephone 13 is connected to a telephone company central office 19 via its telephone line 15, and a telephone answering device 11 is connected to the same or different telephone company central office 19 using its respective telephone line 16. Within the telephone answering device 11, the telephone line 16 interfaces with a telephone line interface (TLI) 12 which provides the conventional isolation, DC and AC impedance as required by relevant telephone company standards.

The telephone line interface 12 also provides a ring detect signal to a controller 23. The controller 23 can be any suitable processor, e.g., microprocessor, microcontroller, or digital signal processor (DSP).

A call information detector/receiver 31 (e.g., a Caller ID detector/receiver) is also provided to receive relevant call related information, e.g., a telephone number and/or household name of a caller, transmitted by the central office 19 to the called party before the incoming call is answered. The call related information may be stored in relevant memory and/or displayed on a display 33. The telephone answering device 11 further includes an alpha-numeric keypad 29 and other buttons relevant to the conventional operation of a telephone answering device, e.g., for PLAY, RECORD, REWIND and FAST FORWARD control of outgoing greeting messages and stored voice messages.

In operation, after a desired number of ring signals, the controller 23 typically instructs the telephone line interface 12 to place the telephone line 16 in an off-hook state, and instructs a voice recorder/playback audio module 25 to play an outgoing greeting message on the telephone line 16 to the calling party. Thus, to inform a caller about a forwarding telephone number, a user would conventionally record an appropriate outgoing greeting message such as "Hi. Please call me at (202) 555-1212". The user presumably desires for the caller to call again at the new forwarding telephone number, but the caller may choose to nevertheless leave a voice message at the telephone answering device. Thus, upon completion of the outgoing greeting message, the calling party can leave a voice message in voice memory 27 of the telephone answering device 11 under the control of controller 23.

Although the conventional methods of providing verbal forwarding information to a caller are useful, they have shortcomings. For instance, a central office typically forwards all callers invisibly to the caller, who in that instance will not know the actual telephone number to which they are calling, or are provided with a verbal indication of a forwarding telephone number requiring the caller to grab a pen and paper and hopefully jot down the correct number. If the telephone number is not written down before the message completes, oftentimes the caller must call again to re-listen to the missed portions of the verbal forwarding message.

Thus, there is a need for apparatus and a method which provides forwarded telephone number information to a caller, either in a temporary or permanent forwarding situation, in a manner which does not require a user to manually write down the telephone number for callback.

SUMMARY

In accordance with the principles of the present invention, a forwarding telephone number receiver for use in a telephone comprises a data receiver adapted to receive downloaded data corresponding to a forwarding telephone number, and storage for maintaining the received downloaded data corresponding to the forwarding telephone number.

In accordance with another aspect of the present invention, a telephone comprises a telephone line interface adapted to interface the telephone to a telephone line. A processor is adapted to control operations of the telephone. An automatic telephone number download module is adapted to download a forwarding telephone number to the telephone.

In accordance with yet another aspect, a telephone answering device comprises a forwarding telephone number download module, a telephone line interface, and a processor adapted to control operations of the forwarding telephone number download module and the telephone line interface.

A method of downloading a forwarding telephone number to a caller in accordance with the principles of the present invention comprises receiving a first telephone call from a calling party over a telephone line, and downloading data corresponding to a forwarding telephone number to the calling party over the telephone line.

A method of notifying a caller of a forwarding telephone number from a telephone answering device in accordance with another aspect of the present invention comprises storing a plurality of predetermined call related information. Call related information with respect to a calling party is received and compared to the stored plurality of predetermined call related information. Data corresponding to a forwarding telephone number is downloaded to the calling party if a match is found with respect to the comparison.

BRIEF DESCRIPTION OF THE DRAWINGS

Features and advantages of the present invention will become apparent to those skilled in the art from the following description with reference he drawings, in which.

DETAILED DESCRIPTION OF ILLUSTRATIVE EMBODIMENTS

The present invention provides an apparatus and method to automatically download data corresponding to a forwarding telephone number to a calling party during an original telephone call. In one embodiment, a central office provides forwarding telephone number data to the caller using frequency shift keying (FSK) such as is used in transmitting call related information, e.g., Caller ID information. In another embodiment, a customer premises equipment such as a telephone answering device provides forwarding telephone number data to a calling party using dual tone, multiple frequency (DTMF) tones. In either embodiment, the telephone equipment used by the caller to receive the forwarding telephone number data can include an auto dialer module to provide the ability to automatically dial the downloaded forwarding telephone number after the original telephone call is terminated.

Figure 1:
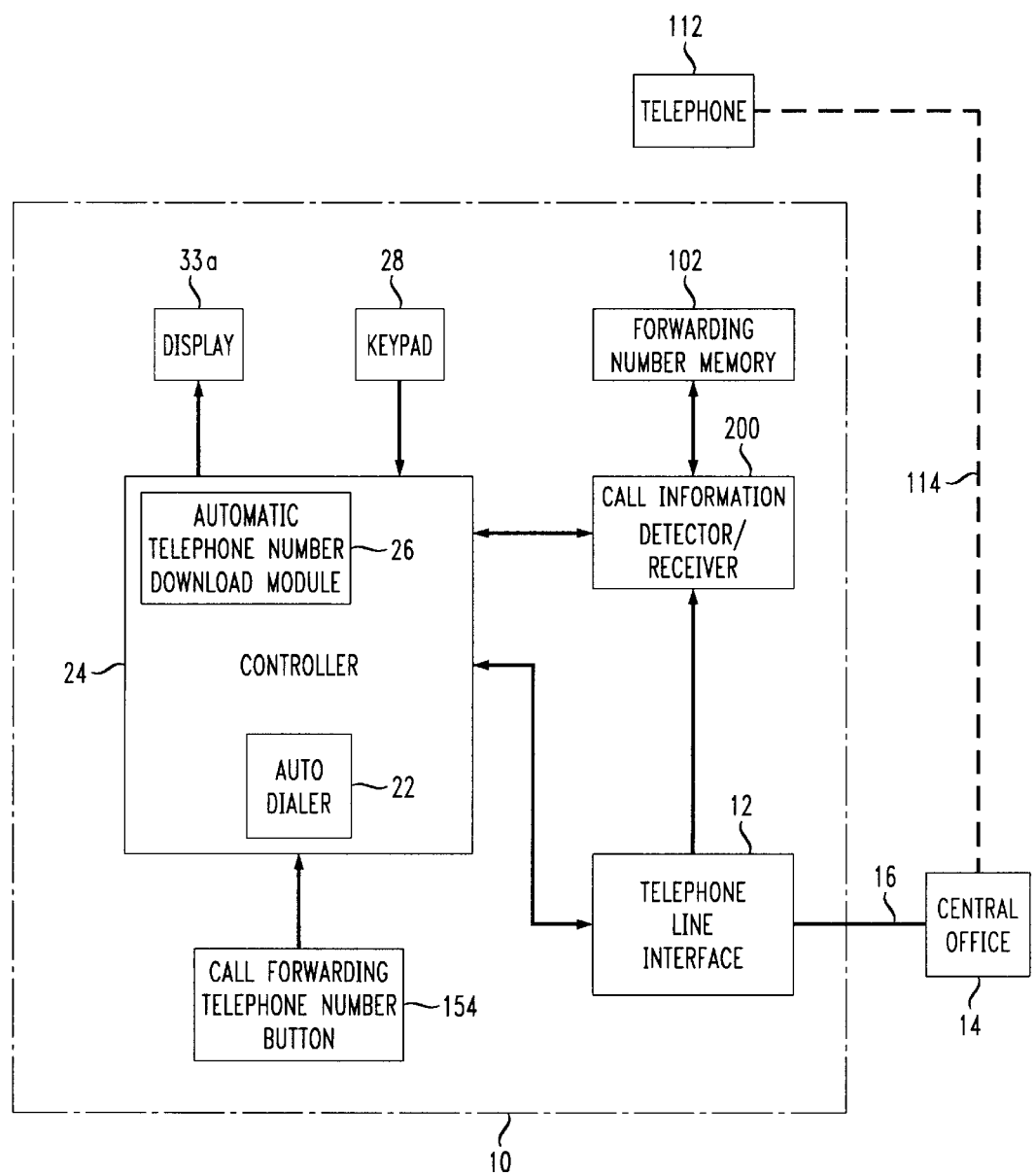
FIG. 1 shows a first embodiment wherein a central office provides data corresponding to a forwarding telephone number to a caller using, e.g., frequency shift keying (FSK), in accordance with the principles of the preset invention.

In the first embodiment, a central office provides forwarding telephone number data to a caller's telephone or other customer premises equipment using frequency shift keying (FSK) as shown in FIG. 1.

In particular, FIG. 1 shows customer premises equipment, e.g., a telephone 10. The telephone 10 includes a conventional telephone line interface 12 and keypad 28. Moreover, an otherwise conventional call information detector/receiver 200 used to receive call related information, e.g., Caller ID information, relating to incoming calls additionally receives forwarding information data, e.g., corresponding to a forwarding telephone number, from the central office during an outgoing telephone call.

In operation, a user of the telephone 10 places a call to telephone 112. However, upon dialing of the original telephone number corresponding to that for telephone 112, the user at the calling telephone receives a download of data from the central office 14 corresponding to a forwarding telephone number using, e.g., FSK techniques. Thus, the call information detector receiver 200, which is utilized when a call is incoming to the telephone 10 to detect and receive information with respect to an incoming telephone call is additionally utilized in accordance with the principles of the present invention to receive data corresponding to a forwarding telephone number from the central office during an outgoing call.

While the data corresponding to the forwarding telephone number is being received by the call information detector/receiver 200 of the telephone 10, the earpiece of the handset (or speaker if the telephone 10 is a speakerphone) is preferably muted or otherwise suppressed to eliminate any possible annoyance to the user from hearing audible portions of the FSK data.

Once received, the forwarding telephone number data may be stored in forwarding calling number memory 102 for subsequent use by an auto dialer module 22 contained within or external to the controller 24 and/or for display on the display 33a. Upon termination of the original telephone call to the telephone 112 using the originally called telephone number, the controller 24 may optionally instruct the autodialer 22 based on user configured parameters to automatically dial the forwarding telephone number. In this way the user of the telephone 10 need not jot down the forwarding telephone number. Instead, the forwarding telephone number can be dialed either automatically by the auto dialer 22 after hanging up the telephone 10, or in response to a manual command, e.g., upon depression of a dedicated "call forwarding telephone number" button 154, or the like.

Figure 2:
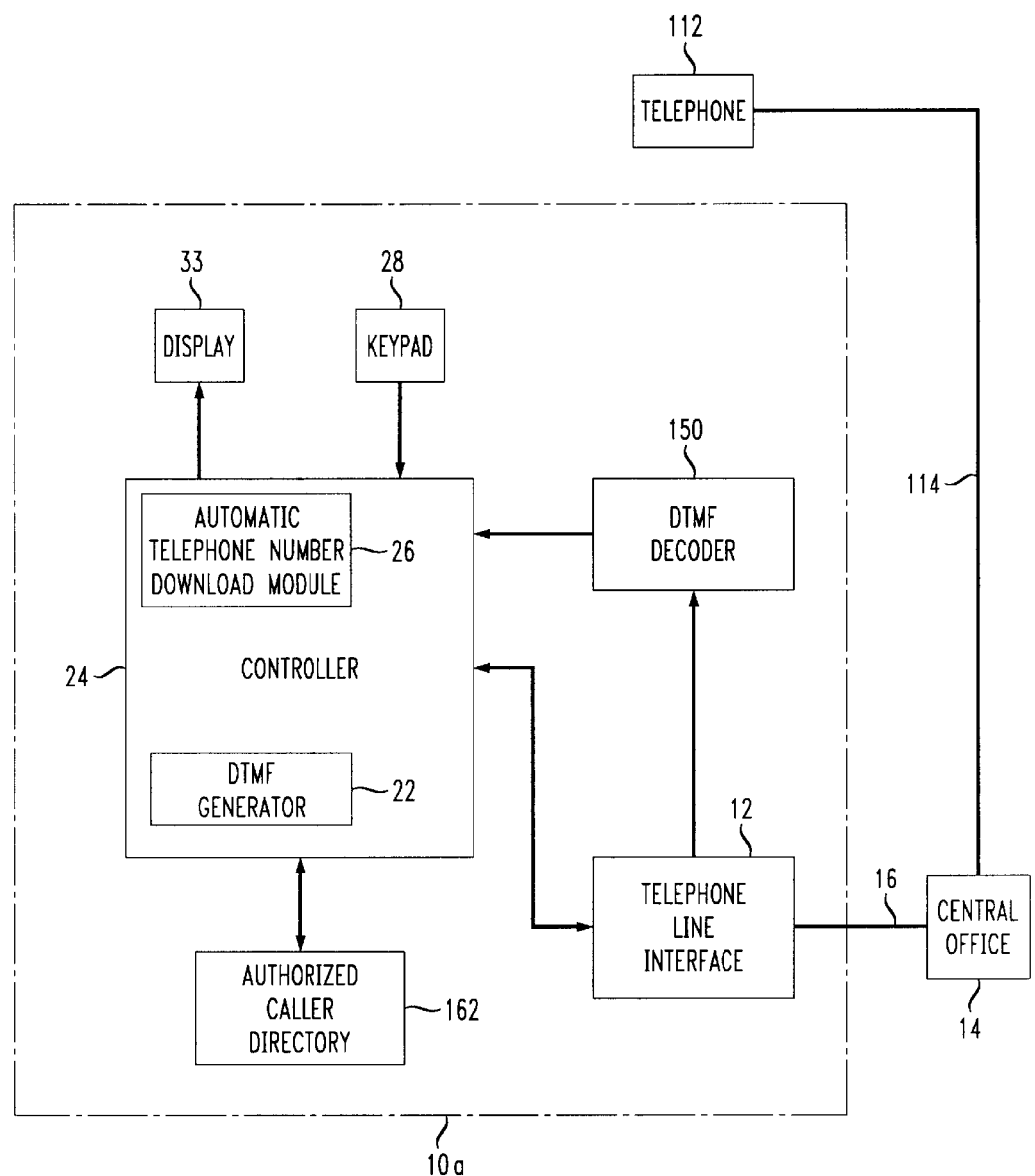
FIG. 2 shows another embodiment in accordance with the principles of the present invention wherein called customer premises equipment such as a telephone answering device provides data corresponding to a forwarding telephone number to a calling party in the form of, e.g., dual tone, multiple frequency (DTMF) tones.

In another embodiment shown in FIG. 2, the called telephone or other customer premises equipment 112 itself (instead of the central office) provides data corresponding to a forwarding telephone number to a calling party. Preferably, the forwarding telephone number data is downloaded to the calling party using dual tone, multiple frequency (DTMF) tones, but may instead be transmitted using FSK, quadrature amplitude modulation (QAM) or other telephone compatible data signaling technique. As with the embodiment shown in FIG. 1, it is preferred that the earpiece or speaker of the receiving telephone 10a be muted or otherwise suppressed during reception of the forwarding telephone number data from the called party.

In particular, FIG. 2 illustrates a called party's telephone 112 capable of downloading data corresponding to a different contact telephone number, i.e., a forwarding telephone number, to a calling party's telephone 10a. The called party's telephone 112 transmits data corresponding to forwarding information, e.g., a telephone number, preferably when the telephone 112 goes off-hook. In a preferred embodiment, the telephone 112 is a telephone answering device which is capable of announcing the availability of a forwarding telephone number, and audibly transmitting data corresponding to the forwarding telephone number.

The forwarding telephone number is preferably audibly recorded as part of the outgoing greeting message of the called party's telephone, but may alternatively be generated by a suitable DTMF tone generator for each telephone call. If the called party's telephone 112 is a common telephone, then preferably a DTMF tone generator is included in the common telephone and instructed to output data corresponding to forwarding or other relevant information upon going off-hook in response to a telephone call from the calling party's telephone 10a.

The telephone 10a (or 10 shown in FIG. 1) may additionally include an authorized caller directory 162 including a database containing a list of authorized callers input by the user of the telephone 10a. The list of authorized callers can be input by the user via the keypad 28 using suitable prompting by the controller 24 and the display 33. In operation, each forwarding telephone number would be compared against those contained in the list of authorized callers in the authorized caller directory 162 as it is received by the DTMF decoder (FIG. 2) or call information detector/receiver 200 (FIG. 1) to determine whether or not the received, downloaded forwarding telephone number is authorized for callback. Such authorization can help avoid undesirable long distance telephone calls such as out of country telephone calls, or telephone calls to known telemarketers or other undesirable locations.

Each of the entries in the list of authorized callers may be complete telephone numbers or partial telephone numbers. Use of a partial telephone number could help classify a larger number of telephone numbers, e.g., by area code to identify long distance calls, by country code, etc.

Alternatively or additionally, the list of authorized callers in the authorized caller directory 162 can include a list of non-authorized callers to identify those to whom forwarded telephone calls are not to be placed. The list of authorized callers may be comprised of telephone numbers or other caller information manually input by the user. Alternatively, the list of authorized (and/or unauthorized) callers may be comprised of, at least in part, speed dial telephone numbers or other telephone numbers currently programmed into the customer premises equipment 10, 10a.

In another embodiment, a receiving telephone may include a voice-to-text module to interpret voice prompts from a central office or from another telephone with respect to a forwarding telephone number. Thus, for instance, the text of a forwarding message such as "The telephone number you have dialed has changed. The new number is 800-555-1212." can be received by a calling telephone number. Preferably, the voice-to-text module will isolate only the forwarding telephone number from the textualized forwarding message.

Figure 3:
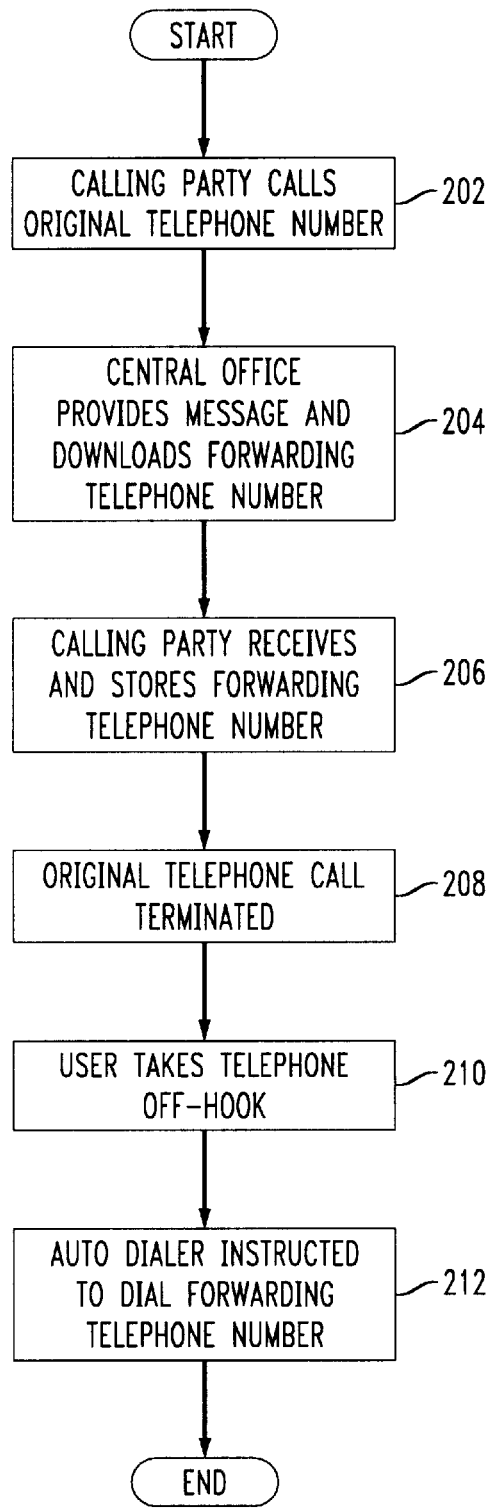
FIG. 3 is a flow chart illustrating the process by which the apparatus of FIG. 1 downloads data corresponding to a forwarding telephone number from a central office, and which has the optional capability to dial the received forwarding telephone number.

A process by which the telephone 10 shown in FIG. 1 receives a forwarding telephone number from a central office is shown in FIG. 3.

In particular, in step 202 shown in FIG. 3, a calling party using telephone 10 shown in FIG. 1 calls an original telephone number.

In step 204, instead of the telephone call going through to the intended party, the caller at the telephone 10 is informed by a verbal message output by the central office 14 that the telephone line 114 is no longer in service, is being forwarded, etc. Also, the central office 14 downloads data corresponding to forwarding information such as a forwarding telephone number using data transmission techniques, e.g., FSK data, back to the calling party at the telephone 10. Preferably, the call information detector/receiver 200 and/or controller 24 shown in FIG. 1 cause muting or suppression of the earpiece or speaker as is known in conventional techniques in Type II customer premises equipment capable of Caller ID/Call Waiting reception of FSK data from a central office with respect to a third party caller.

In step 206, the call information detector/receiver 200 receives and stores the data corresponding to forwarding telephone number downloaded from the central office 14.

In step 208, the original telephone call is terminated, either by the user of the telephone 10 hanging up or by termination of the telephone call by the central office 14.

In step 210, the user at the telephone 10 causes the telephone line 16 to go off-hook and instructs the auto dialer 22 shown in FIG. 1 to automatically dial the received downloaded data corresponding to a forwarding telephone number, as depicted in step 212 and as shown in FIG. 3. Thereafter, the telephone call proceeds in a conventional fashion.

Figure 4:
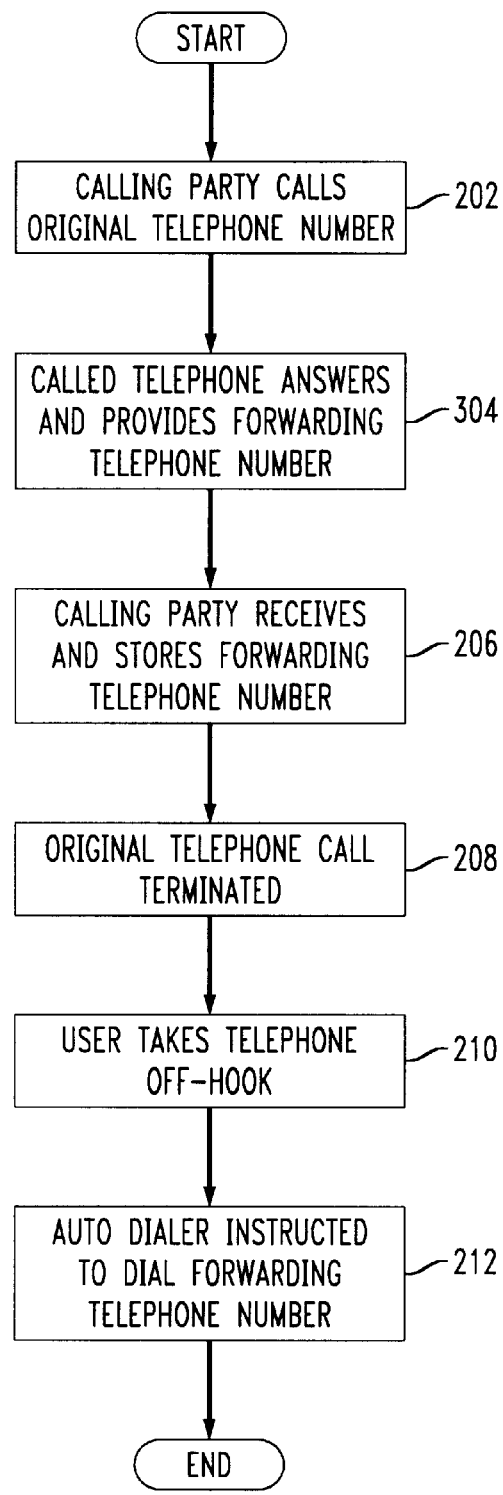
FIG. 4 is a flow chart illustrating the process by which the apparatus of FIG. 2 downloads data corresponding to a forwarding telephone number from a called party during a telephone call, and which has the capability to dial the received forwarding telephone number.
Figure 5:
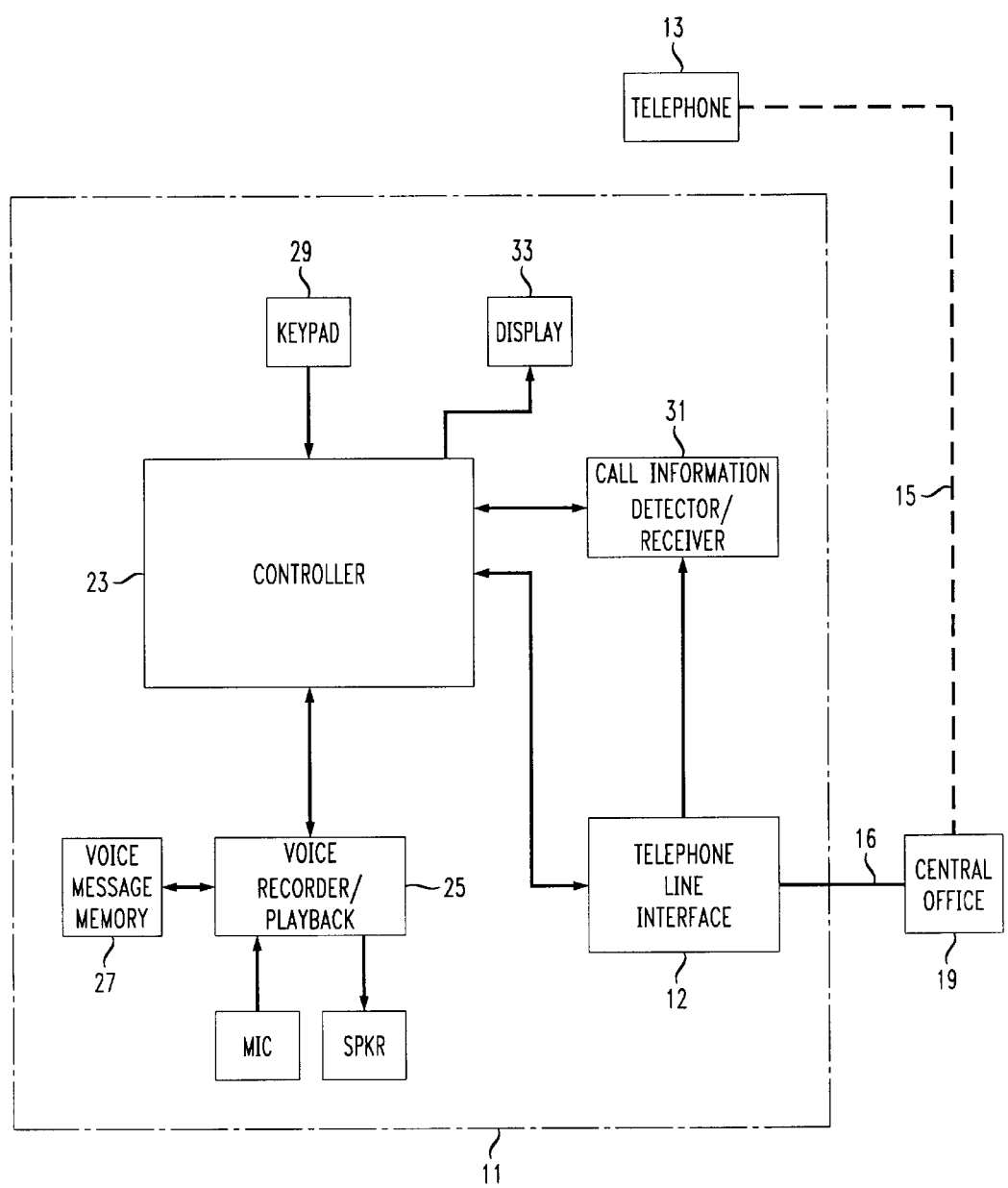
FIG. 5 illustrates a conventional prior art telephone answering device which verbally announces a forwarding telephone number to all callers.

The process shown in FIG. 4 is similar to that shown in FIG. 3 but relates to the apparatus shown in FIG. 2, e.g., to the reception of downloaded data corresponding to forwarding information from the called telephone 112.

In particular, steps 202 and 206–212 are otherwise as shown and described with respect to FIG. 3. However, in FIG. 4, after the calling party calls the original telephone number in step 202, the called telephone, e.g., telephone 112 shown in FIG. 2, provides data representing forwarding information back to the calling telephone 10a. In the disclosed embodiment, the data is transmitted by the called telephone 212 back to the calling telephone 10a using DTMF tones to encode numeric digits of the forwarding telephone number.

Of course, different outgoing greeting messages can be played to the calling party including, such as (but of course not limited to) the following:

a) "Hello, thank you for calling, we have a new telephone number which is (111) 555-1234. Please stand by for the download.";

b) "Hello, thank you for calling, you can reach us today only, Aug. 13, 1998, at a different telephone number, (111) 555-1234. Please stand by for the download"; or c) "Hello, thank you for calling, we have moved and our new telephone number is (111) 555-1234. Please stand by for the download".

In the processes of FIGS. 3 and 4, all or a portion of the received downloaded data corresponding to a forwarding telephone number can be compared to pre-authorized and/or unauthorized telephone numbers or portions of telephone numbers maintained in the authorized caller directory 162 as shown in FIG. 2 to determine if the autodialer 22 should be allowed to dial the relevant forwarding telephone number, as shown in step 212.

The telephone 10, 10a in accordance with the principles of the present invention can include programming in the controller 24 which stores and recalls as necessary data corresponding to the forwarding telephone number such that when the user of the telephone 10, 10a again dials the original telephone number for which forwarding information was previously received, the telephone 10, 10a presents instead the forwarding telephone number to the telephone line 114 rather than the actually dialed telephone number. Preferably, such a substitution of a forwarding telephone number will be announced or displayed to the user of the telephone 10. Also preferably the user of the telephone 10,

10*a* has the configurable option of turning this feature off, which is particularly useful when the called party re-locates back to the original telephone number.

The apparatus and method of the present invention provides a calling party several advantageous benefits. For instance, the calling party will not be required to write down new telephone numbers as a called party moves around, thus saving time and minimizing the chance for errors in writing down the forwarding telephone number. Moreover, the calling party will not be required to remember the forwarding telephone number in the future, thereby saving time in not having to redial the original telephone number to again hear the new forwarding telephone number as in conventional techniques and devices.

Although the disclosed embodiments relate to wired devices, the present invention is equally applicable to use in wireless applications wherein a forwarding telephone number is transmitted, e.g., to a wireless cellular telephone.

While the invention has been described with reference to the exemplary embodiments thereof, those skilled in the art will be able to make various modifications to the described embodiments of the invention without departing from the true spirit and scope of the invention.

What is claim is:

1. A forwarding telephone number receiver for use in a telephone, comprising:
    a data receiver adapted to receive during a first telephone call to a called party automatically downloaded data corresponding to a forwarding telephone number, said forwarding telephone number being an alternate number to reach said called party;
    storage for maintaining said forwarding telephone number to allow a second, separate telephone call to said called party using said forwarding telephone number; and
    a telephone number substitution module to substitute for a dialed telephone number said downloaded forwarding telephone number previously received.

2. The forwarding telephone number receiver for use in a telephone according to claim 1, wherein:
    said data corresponding to said forwarding telephone number is downloaded from a telephone.

3. The forwarding telephone number receiver for use in a telephone according to claim 1, wherein:
    said data corresponding to said forwarding telephone number is downloaded from a telephone company central office.

4. The forwarding telephone number receiver for use in a telephone according to claim 1, wherein:
    said data receiver is a caller ID receiver.

5. The forwarding telephone number receiver for use in a telephone according to claim 1, wherein:
    said data receiver is adapted to receive said data corresponding to said forwarding telephone number using frequency shift keying.

6. The forwarding telephone number receiver for use in a telephone according to claim 1, wherein:
    said data receiver is adapted to receive said data corresponding to said forwarding telephone number using DTMF tone encoding.

7. The forwarding telephone number receiver for use in a telephone according to claim 1, further comprising:
    an autodialer to automatically dial said forwarding telephone number.

8. A telephone, comprising:
    a telephone line interface adapted to interface said telephone to a telephone line;
    a processor adapted to control operations of said telephone; and
    an automatic telephone number download module adapted to download to said telephone during a first telephone call to a called party a forwarding telephone number corresponding to a current telephone number of said called party, said forwarding telephone number to be automatically inserted in place of a dialed telephone number during a second call from said telephone to said called party.

9. The telephone according to claim 8, wherein:
    said telephone includes a telephone answering device.

10. The telephone according to claim 8, further comprising:
    a DTMF tone generator adapted to dial said downloaded forwarding telephone number.

11. The telephone according to claim 8, further comprising:
    a call related information detector/receiver.

12. The telephone according to claim 11, wherein:
    said call related information detector/receiver is a Caller ID detector/receiver.

13. The telephone according to claim 11, further comprising:
    an authorized caller directory adapted to contain a list of at least respective portions of forwarding telephone numbers authorized for dialing by said telephone.

14. A method of automatically unloading a forwarding telephone number to a caller, said method comprising:
    receiving by a called Party a first telephone call to a dialed telephone number, said first telephone call being from a calling party over a telephone line;
    uploading automatically over said telephone line a forwarding telephone number from at least one of a central office and a telephone, said forwarding telephone number being uploaded to said calling party during said first telephone call, said forwarding telephone number being an alternate number to reach said called party; and
    automatically inserting said forwarding telephone number in place of said dialed telephone number dialed by said calling party during a second telephone call.

15. The method of automatically uploading a forwarding telephone number to a caller according to claim 14, wherein:
    said data is uploaded using DTMF tone encoding.

16. The method of automatically uploading a forwarding telephone number to a caller according to claim 15, wherein:
    said DTMF tone encoding is audibly recorded at a telephone corresponding to said calling party.

17. The method of automatically uploading a forwarding telephone number to a caller according to claim 14, wherein:
    said data is uploaded using frequency shift keying.

18. A method of automatically notifying an authorized calling party of a forwarding telephone number associated with a called party from a telephone answering device, said method comprising:
    storing a plurality of predetermined call related information;
    receiving automatically call related information with respect to said authorized calling party from at least one of a central office and a telephone during a first telephone call;
    comparing said received call related information with respect to said authorized calling party to said stored plurality of predetermined call related information;
    uploading to said authorized calling party data corresponding to said forwarding telephone number associated with said called party, said forwarding telephone number being an alternate number to reach said called-party; and inserting said forwarding telephone number in place of a dialed telephone number during a second telephone call by said authorized calling party to said called party if a match is found with respect to said comparison of call related information.

19. A telephone answering device, comprising:

a forwarding telephone number upload module for automatically uploading a forwarding telephone number, said forwarding telephone number being an alternate number to reach a called party associated with said telephone answering device;

a telephone line interface;

a processor adapted to control operations of said forwarding telephone number upload module and said telephone line interface; and a telephone number substitution module to substitute for a dialed telephone number said uploaded forwarding telephone number previously received.

20. The telephone answering device according to claim 19, further comprising:

a DTMF generator.

* * * * *